United States Patent
Walters et al.

(10) Patent No.: US 9,260,036 B2
(45) Date of Patent: Feb. 16, 2016

(54) SYSTEM AND METHOD FOR ERROR CORRECTION IN ANGULAR POSITION SENSORS

(71) Applicant: Allison Transmission, Inc., Indianapolis, IN (US)

(72) Inventors: James E. Walters, Carmel, IN (US); Ronald J. Krefta, Noblesville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/621,498

(22) Filed: Feb. 13, 2015

(65) Prior Publication Data

US 2015/0158396 A1 Jun. 11, 2015

Related U.S. Application Data

(63) Continuation of application No. PCT/US2013/032064, filed on Mar. 15, 2013.

(60) Provisional application No. 61/691,482, filed on Aug. 21, 2012.

(51) Int. Cl.
*G01C 21/00* (2006.01)
*H02P 25/00* (2006.01)
(Continued)

(52) U.S. Cl.
CPC ............... *B60L 15/20* (2013.01); *B60W 20/00* (2013.01); *B60W 50/02* (2013.01); *B60W 50/04* (2013.01);
(Continued)

(58) Field of Classification Search
CPC .... B60L 15/20; B60L 2240/42; B60W 20/00; B60W 50/02; B60W 50/04; G01D 5/24476; H02P 2203/05; H02P 6/16; H02P 21/0032; H02P 21/146; H02P 21/005; H02P 2207/05; Y10S 903/903
USPC ............. 701/22, 29.7, 29.8, 30.3–30.9, 31.6, 701/498, 501, 505, 518, 520; 180/206.3, 180/6.44, 6.48, 6.5; 280/479.1; 340/648, 340/319, 856.2, 856.3, 870.04, 938, 995.28, 340/426.24, 426.25, 539.22, 549, 545.2, 340/643; 318/400.02, 400.01, 400.07, 318/400.14, 400.34, 400.38, 400.39, 721, 318/799; 388/805, 811, 815, 819, 930
See application file for complete search history.

(56) References Cited

U.S. PATENT DOCUMENTS

| | | | |
|---|---|---|---|
| 4,472,669 A | 9/1984 | Denham et al. | |
| H104 H * | 8/1986 | Hung | H03M 1/1038 318/632 |

(Continued)

FOREIGN PATENT DOCUMENTS

| | | |
|---|---|---|
| EP | 1 375 304 A2 | 1/2004 |
| JP | 2001-025283 | 1/2001 |
| KR | 10-2004-0080547 | 9/2004 |

OTHER PUBLICATIONS

International Search Report and Written Opinion issued in PCT/US2013/032064, dated Jun. 21, 2013.

*Primary Examiner* — Muhammad Shafi
(74) *Attorney, Agent, or Firm* — Woodard, Emhardt, Moriarty, McNett & Henry LLP

(57) ABSTRACT

A system and method for controlling a rotating E-machine and for correcting a rotational position signal output by an angular position sensor operatively connected to the E-machine in conjunction with a sensor digital converter is disclosed. For each angular operating speed of interest, a set of signals as a function of position is taken such that the harmonics (or sub-harmonics) related to the position sensor may be determined and isolated from errors due to an associated digital converter. From this information, the magnitude and phase of the position sensor harmonics is determined. The effects of the sensor digital converter (or other signal processing equipment) are then determined and accounted for, allowing the control system to apply the total position error signal to the position sensor output signal to determine a corrected position sensor signal for use in controlling the E-machine.

27 Claims, 4 Drawing Sheets

(51) Int. Cl.
  *B60L 15/20* (2006.01)
  *B60W 50/02* (2012.01)
  *B60W 50/04* (2006.01)
  *H02P 6/16* (2006.01)
  *B60W 20/00* (2006.01)
  *G01D 5/244* (2006.01)

(52) U.S. Cl.
  CPC .............. *H02P 6/16* (2013.01); *B60L 2240/42* (2013.01); *G01D 5/24476* (2013.01); *H02P 2203/05* (2013.01); *Y10S 903/903* (2013.01)

(56) References Cited

U.S. PATENT DOCUMENTS

| | | | |
|---|---|---|---|
| 4,794,511 A | 12/1988 | Lundin | |
| 6,389,373 B1 | 5/2002 | Ohya | |
| 7,047,145 B2 | 5/2006 | Ishizuka et al. | |
| 7,561,968 B2 | 7/2009 | Liu et al. | |
| 7,659,688 B2 | 2/2010 | Schulz et al. | |
| 7,746,023 B2 | 6/2010 | Ajima et al. | |
| 7,768,220 B2 | 8/2010 | Schulz et al. | |
| 8,232,795 B2 | 7/2012 | Saruki et al. | |
| 8,242,720 B2 * | 8/2012 | Daboussi | H02P 21/0032 318/400.01 |
| 8,803,454 B2 * | 8/2014 | Daboussi | H02P 21/0032 318/400.01 |
| 2006/0012328 A1 | 1/2006 | Yasukawa et al. | |
| 2008/0065294 A1 | 3/2008 | Katrak et al. | |
| 2008/0120055 A1 | 5/2008 | Cheng | |
| 2008/0129242 A1 | 6/2008 | Liu et al. | |
| 2010/0188033 A1 * | 7/2010 | Daboussi | H02P 21/0032 318/400.34 |
| 2012/0326639 A1 * | 12/2012 | Daboussi | H02P 21/0032 318/400.02 |

* cited by examiner

SYSTEM AND METHOD FOR ERROR CORRECTION IN ANGULAR POSITION SENSORS

CROSS REFERENCE TO RELATED APPLICATION

This application is a continuation of International Application No. PCT/US2013/032064 filed Mar. 15, 2013, which claims the benefit of U.S. Provisional Patent Application No. 61/691,482 filed Aug. 21, 2012, the entire disclosures of which are hereby incorporated by reference.

BACKGROUND

The present invention generally relates to monitoring and control of rotating machinery and, more particularly, to a system and method for performing error correction in rotor position signals received from angular position sensors, such as resolvers.

Many vehicle drive systems, such as those present in electric and hybrid vehicles, use a rotating electric machine, such as a permanent magnet (PM) machine, to help direct power to the vehicle transmission and wheels. In order to accurately and efficiently perform dynamic torque control of the rotating electric machine, an angular position sensor is typically used to determine the angular position of the rotor. The position sensor, which often comprises a rotating electrical transformer device known as a resolver, is susceptible to a variety of error sources that can reduce the overall system performance. For example, mechanical errors can be introduced when centering the rotor of a resolver relative to its stator during assembly. In addition to mechanical tolerances, errors can be introduced during the processing of the position sensor output signals, such as when the finite bandwidth of an analog-to-digital converter changes the spectral behavior of the signals.

In certain applications, the system is designed to accept such error and the resulting reduction in performance is tolerated. If the reduction in performance is not permissible, digital filtering techniques can be used to attempt to filter the error. However, known filtering techniques are often inadequate and may cause additional undesirable phase shift and lag effects.

An improved technique for correcting errors in the position sensor output is therefore needed which will dynamically learn the position error associated with a position sensor and correct for such error when the system is used in its intended application.

SUMMARY

According to one aspect of the present disclosure, a system is presented for controlling a rotating E-machine and for correcting a rotational position signal output by an angular position sensor operatively connected to the E-machine in conjunction with a sensor digital converter. For each angular operating speed of interest, a set of signals as a function of position is taken such that the harmonics (or sub-harmonics) related to the position sensor may be determined and isolated from errors due to an associated digital converter. From this information, the magnitude and phase of the position sensor harmonics is determined. The effects of the sensor digital converter (or other signal processing equipment) are then determined and accounted for, allowing the control system to apply the total position error signal to the position sensor output signal to determine a corrected position sensor signal for use in controlling the E-machine.

According to another aspect, a system for controlling a vehicle drivetrain is presented, comprising a rotating E-machine operatively connected to the vehicle drivetrain, an angular position sensor operatively connected to the rotating E-machine and producing a sensor output signal, a sensor digital converter operatively connected to the angular position sensor, the sensor digital converter receiving said sensor output signal and producing a converter output signal, and a controller operatively connected to the sensor digital converter. The controller operates the E-machine at a first angular speed, compensates for a first error in the converter output signal, said first error due to the angular position sensor, and further compensates for a second error in the converter output signal, the second error due to the sensor digital converter.

According to another aspect, a method for controlling a vehicle drivetrain is presented comprising rotating an E-machine, the E-machine operatively connected to an angular position sensor, measuring a first signal generated by an angular position sensor operatively connected to the E-machine, storing data representing the first signal over at least one electrical cycle, compensating an output signal for the effects of both a first error due to the angular position sensor and a second error due to the effects of a sensor digital converter operatively connected to the angular position sensor.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
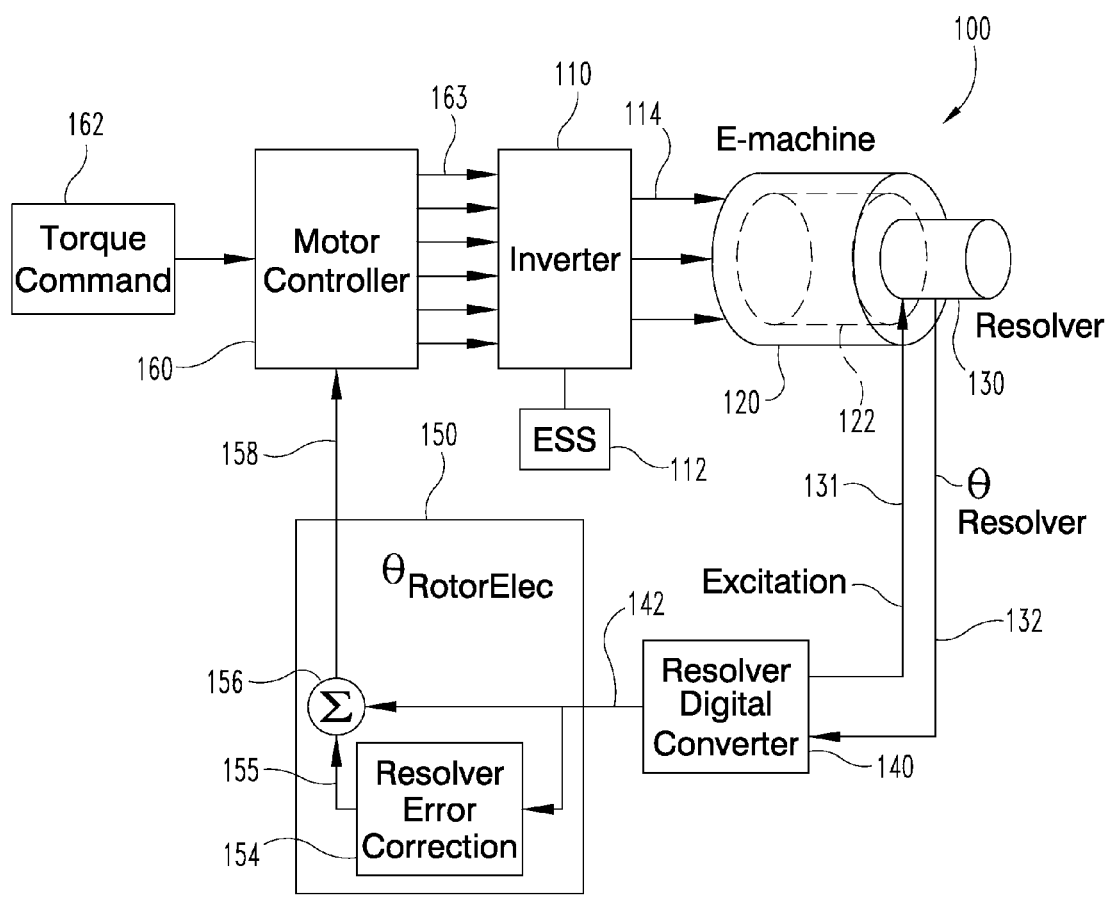
FIG. 1 is a schematic diagram of a hybrid drive control system according to one embodiment of the present disclosure.

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

FIG. 1 shows a diagrammatic view of a vehicle hybrid drive control system 100 according to one embodiment of the present disclosure. The control methods described herein are applicable to any type of electric or hybrid vehicle drive which incorporates a rotating electric machine (E-machine). As shown, the system 100 includes an inverter 110, an energy storage system (ESS) 112, an E-machine 120, an angular position sensor, illustrated here as resolver 130, a sensor digital converter, illustrated here as resolver-to-digital converter (RDC) 140, an error correction controller 150, and a motor controller 160.

In order to provide adequate control of the E-machine 120, the motor controller 160 must receive accurate angular position signals from the resolver 130 (via RDC 140). The RDC 140 is required to generate the signals that excite the resolver and to demodulate the resolver's output signals so that a position estimate can be dynamically tracked and converted into raw resolver format position signal output by the resolver 130. The resolver 130 and the RDC 140 each contribute a separate component to the overall error, although the characteristics of each component are different. Most resolver-based errors are harmonic in nature, and the magnitude of each position component is independent of speed, with the resulting speed error being proportional to speed, an attribute that is important. On the other hand, most RDC errors are dependent on speed, but do not vary proportionally with speed. If a large number of samples are taken of the position signals over a variety of speeds, the results can be analyzed to determine those harmonics which vary proportionally with speed and those which do not. Harmonics which do not vary with speed or vary proportionally with speed can be determined to be resolver related, allowing an equation for the resolver-related error signal to be determined. Likewise, a separate equation for the RDC error can be determined and combined with the resolver-related error equation to determine an overall equation for the expected error. This information can then be used to compensate for errors in the signal received by the motor controller 160.

In general operation, the motor controller 160 receives a desired torque command 162 from an external control system, such as an operator throttle control. Based on various inputs, including signals received from error correction controller 150, the motor controller 160 outputs gate signals 163 to the inverter 110. The inverter 110 converts DC power from the ESS 112 into AC power signals 114 which drive the E-machine 120.

Inverter 110 may comprise a DC-AC inverter which converts DC power from the ESS 112 into AC power for driving the E-machine 120. E-machine 120 may comprise an electric motor, generator, permanent magnet machine, or any other type of electric rotating machine used to assist in propelling, powering, or stopping a vehicle.

Resolver 130 preferably comprises a rotary angular position sensor, such as a rotating electrical transformer having stator windings and optional rotor windings, and configured to output position signals based on the relative angular position of the electromagnetized stator and rotor windings when supplied with an excitation signal. RDC 140 comprises a sine wave generator which supplies an excitation signal 131 to the resolver 130 and receives modulated analog signals 132 containing the position information in return. RDC 140 demodulates the signals 132 and dynamically produces a position signal 142. It shall be understood that the resolver 130 and the RDC 140 may be provided as a single unit or as separate components. In certain embodiments, the functionality of the RDC 140 may be included within the error correction controller 150 or the motor controller 160.

The motor controller 160 is in operative communication with various sensors, actuators, transformers, and controllers in the vehicle powertrain including, but not limited to, inverter 110 and error correction control unit 150. In addition, the motor controller 160 may receive additional signals, such as voltage, current, phase, temperature, position, and/or other variables for the efficient control of the system 100.

Error correction controller 150 is in operative communication with RDC 140 and motor controller 160 and is configured to determine and compensate for errors in the resolver position and RDC output signals. In certain embodiments, the error correction controller 150 may be incorporated within the motor controller 160.

In a typical embodiment, error correction controller 150 and the motor controller 160 may each include a computer having a processor, memory, and input/output connections. It shall be understood that additional elements may be included in the motor controller 160 and error correction control unit 150 as required by the particular application. It shall be further understood that the error correction controller 150 may optionally share a processor and storage with the motor controller 160 and/or may be provided in a separate physical housing or integrated as a single unit.

Resolver 130 is operably mounted to the E-machine 120 such that the rotor of the resolver 130 rotates in unison with the rotor 122 of the E-machine 120 in order to sense the angular position of the E-machine 120, while the stator of the resolver 130 is held stationary. As will be explained in further detail below, the output 132 of resolver 130 is fed to RDC 140, which converts the resolver signals into a digital representation of the angular position. The output 142 of the RDC 140 is then fed to error correction controller 150, which uses resolver error correction block 154 to determine a resolver error signal 155. The resolver error signal 155 is then inverted and combined with the original signal 142 at block 156, and output as corrected position signal 158 to the motor controller 160 for use in determining the proper gate signals 163.

An analysis of the error signals related to the resolver 130 and the RDC 140 will now be presented. Starting with the errors from the resolver 130, the resolver output signals 132 will typically include errors which are harmonics of the angular velocity. These errors come from a variety of sources, including resolver winding harmonics and mechanical effects such as lack of concentricity and run out. However, the underlying position error amplitude is generally independent of angular speed, an attribute that can be exploited as described further below.

Angular speed, or frequency (which is determined from angular position), is used as a control variable for higher order motor control functionality such as dq cross-axis and flux decoupling. Therefore, the resolver position error can lead to significant problems for the E-machine controls.

The general equations relating the terminal voltage, current, and magnet flux of a permanent magnet machine (such as E-machine 120) in the rotor reference frame are shown below as equations (1) and (2).

$$V_{qs}^{r}=r_{s}I_{qs}^{r}+pL_{qs}I_{qs}^{r}+\omega_{e}(\lambda_{magnet}+L_{ds}I_{ds}^{r}) \tag{1}$$

$$V_{ds}^{r}=r_{s}I_{ds}^{r}+pL_{ds}I_{ds}^{r}-\omega_{e}L_{qs}I_{qs}^{r} \tag{2}$$

where:
$V_{qs}^{r}$=q-axis voltage
$V_{ds}^{r}$=d-axis voltage
$I_{qs}^{r}$=q-axis current
$I_{ds}^{r}$=d-axis current
$L_{qs}$=q-axis inductance
$L_{ds}$=d-axis inductance
$r_{s}$=stator resistance
$\lambda_{magnet}$=flux linkage of the magnet
$\omega_{e}$=electrical frequency in radians/second
p=time derivative operator The cross coupling terms, $\omega_e L_{qs} I_{qs}^r$ and $\omega_e L_{ds} I_{ds}^r$, and the magnet flux linkage term, $\omega_e \lambda_{magnet}$, are generally decoupled by the controller 160 in order to improve the overall controller performance. The electrical frequency term, $\omega_e$, is based on the rotational frequency of the E-machine 120 and necessitates having an accurate measurement of speed.

The relationship of the E-machine 120 mechanical rotational frequency to the resolver 130 frequency is shown below in equation (3). The corresponding relationship of the E-machine 120 electrical frequency to E-machine 120 mechanical rotational frequency is shown in equation (4).

$$\theta_{ResolverElec} = (P_{resolver}/2)\theta_{RotorMech} \quad (3)$$

$$\theta_{MachineElec} = (P_{motor}/2)\theta_{RotorMech} \quad (4)$$

where:
$\theta_{RotorMech}$=the E-machine mechanical angular position
$\theta_{MachineElec}$=the E-machine electrical position
$\theta_{ResolverElec}$=the resolver electrical position
$P_{resolver}$=the number of electrical poles of the resolver
$P_{motor}$=the number of electrical poles of the E-machine In order to simplify the analysis, it may be assumed that $P_{resolver}$ is equal to $P_{motor}$, although this is not a requirement.

The harmonics of the resolver position error are generally of the greatest concern since they lead to large variations in the speed estimate. For example, assume that the accuracy of the resolver 130 is +/−4 degrees, and the position error is at the $5^{th}$ harmonic of the resolver frequency. The measured position signal will be equal to:

$$\theta_{meas}(t) = \theta(t) + 4°(\pi/180°)\sin(5\omega_e(t) + \phi_5) \quad (5)$$

where:
$\theta_{meas}(t)$=the measured resolver position signal in electrical radians at time t
$\theta(t)$=the ideal resolver position signal at time t
$\omega_e$=resolver frequency in radians/second
$\phi_5$=the phase of the fifth harmonic of the resolver frequency signal Likewise, the measured speed signal of the resolver 130 in electrical radians/second will be:

$$\omega_{meas}(t) = \omega_e(t) + 4°(\pi/180°)5\omega_e \cos(5\omega_e(t) + \phi_5) \quad (6)$$

where:
$\omega_{meas}(t)$=the measured resolver angular speed signal in electrical radians/second at time t
$\omega_e(t)$=the ideal resolver angular speed signal at time t
$\phi_5$=the phase of the fifth harmonic of the resolver frequency signal In addition, the relationship of resolver speed in electrical radians/sec to revolutions per minute (RPM) can be expressed as:

$$\omega_e = (RPM)(2\pi/60)(P_{motor}/2) \quad (7)$$

where:
$\omega_e$=resolver speed in electrical radians/second
$P_{motor}$=the number of motor poles
RPM=resolver speed in mechanical revolutions per minute Therefore, equations (6) and (7) can then be combined to express the relationship between speed error and resolver-related position error as:

$$RPM_{error} = \theta_{error} \pi(N)(RPM)/180 \quad (8)$$

where:
$RPM_{error}$=speed error in revolutions per minute
$\theta_{error}$=resolver position error in degrees electrical
N=the harmonic order of the error
P=the pole number of the E-machine (assumed equal to resolver pole number)

Applying equation (8), for a 4 degree resolver position error at the $5^{th}$ harmonic of a 20 pole E-machine rotating at 3,000 RPM, the resulting speed error would be +/−1,047 RPM. Such a large error is unacceptable as it would lead to significant control issues and instability. In addition, the basic position error will cause the inverter 110 to track the reported position variation, adjusting $I_d$ and $I_q$ currents in the motor control process as would be appropriate. This deviation in tracking results in undesirable torque pulsations, in addition to problematic variations in voltage and current.

However, in addition to errors resulting from the resolver 130 itself, further error may be introduced by the RDC 140 which is used in conjunction with the resolver 130. The RDC 140 is required to demodulate the position signals 132 from the resolver 130 and generate a digital estimate 142 of the position signals 132. The output of the RDC 140 is eventually directed to the motor controller 160 and used for controlling torque. As mentioned above, the RDC 140 has a unique set of spectral characteristics which must also be accounted for if error is to be minimized.

Figure 2:
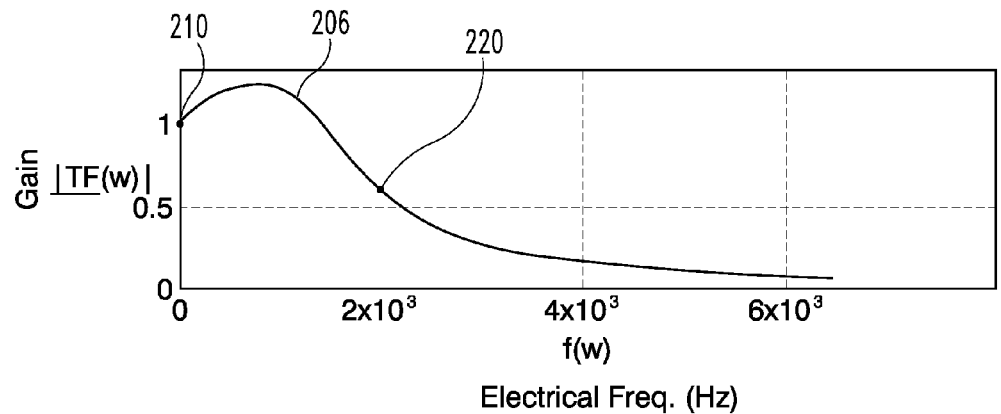
FIG. 2 is a diagram showing the gain component of the transfer function of a resolver to digital converter according to one embodiment of the present disclosure.
Figure 3:
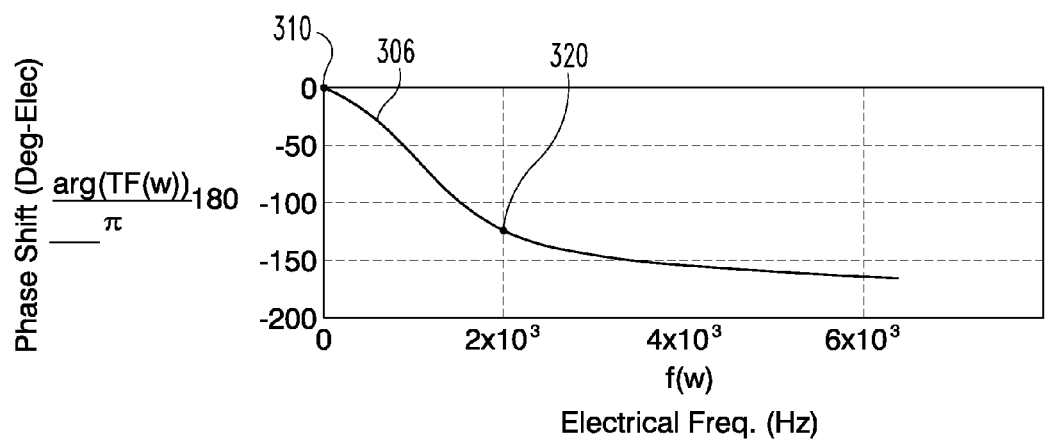
FIG. 3 is a diagram showing the phase shift component of the transfer function of a resolver to digital converter according to one embodiment of the present disclosure.

FIGS. 2 and 3 illustrate sample transfer functions for gain and phase, respectively, of a typical RDC, such as a model AD2S1205 resolver to digital converter manufactured by Analog Devices, Inc. of One Technology Way, P.O. Box 9106, Norwood, Mass. 02062-9106, U.S.A. FIG. 2 shows the gain function 206 and FIG. 3 shows the phase shift function 306. The transfer functions 206 and 306 illustrate how different frequencies are modified by the characteristics of the RDC 140. For DC signals (0 Hz), which occur at a fixed RPM, the gain is unity (point 210) and the phase shift is zero (point 310). However, for higher order harmonics, such as those present in resolver harmonic error, there is a significant gain and phase shift. For example, points 220 and 320 respectively illustrate the a gain of approximately 0.6 and phase shift of approximately −120 degrees-electrical at a frequency of $2\times10^3$ Hz.

Figure 4:
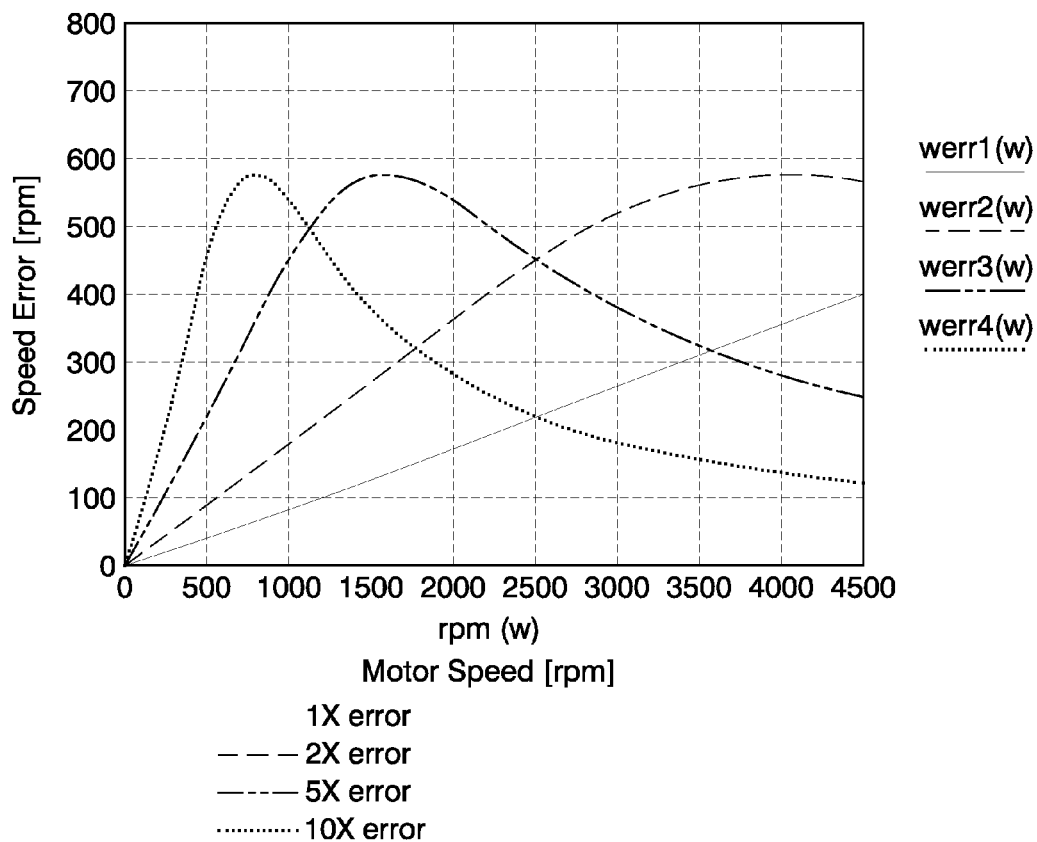
FIG. 4 is a diagram showing the relationship between motor speed and speed error for a variety of harmonics of the speed.

By combining the magnitude gain and phase shift associated with the RDC 140 (FIG. 2 above) with that of the resolver 130 (Equation (8) above), the effect of the combined resolver/RDC system on position or speed error as a function of harmonic order can be determined FIG. 4 illustrates the results for speed (RPM) error magnitude as a function of frequency.

Unlike resolver-based errors, RDC-based errors are dependent upon speed (yet are not proportional to speed). While the impact of the $5^{th}$ harmonic resolver error is shown to be reduced when the entire system is considered, it is now also a function of speed which is not desirable.

If the effect of the RDC 140 is ignored initially, the underlying position error due to the resolver can be found by considering the spectral properties of the speed signal reported by the idealized RDC 140. In the ideal case of a fixed speed and no error present, the spectral content of the speed signal from the resolver 130 should only exist at DC or zero Hz. In reality, the error must be found in the system which may have a dynamic load (pump) or source (engine).

In the case of an engine spinning at 600 RPM, the expected spectral content from the system would be as follows:

| Frequency | Source |
|---|---|
| 0 Hz (DC) | Ideal Speed Content |
| 10 Hz | Mechanical Rotational Frequency |
| 30-40 Hz | Engine Firing Fundamental (6-8 cylinder) |
| 100 Hz | Electrical (Machine and Resolver if 10 Pole Pair) |

-continued

| Frequency | Source |
|---|---|
| 200 Hz | Resolver $2^{nd}$ electrical harmonic |
| 240 Hz | Resolver $24^{th}$ mechanical harmonic |

Figure 5:
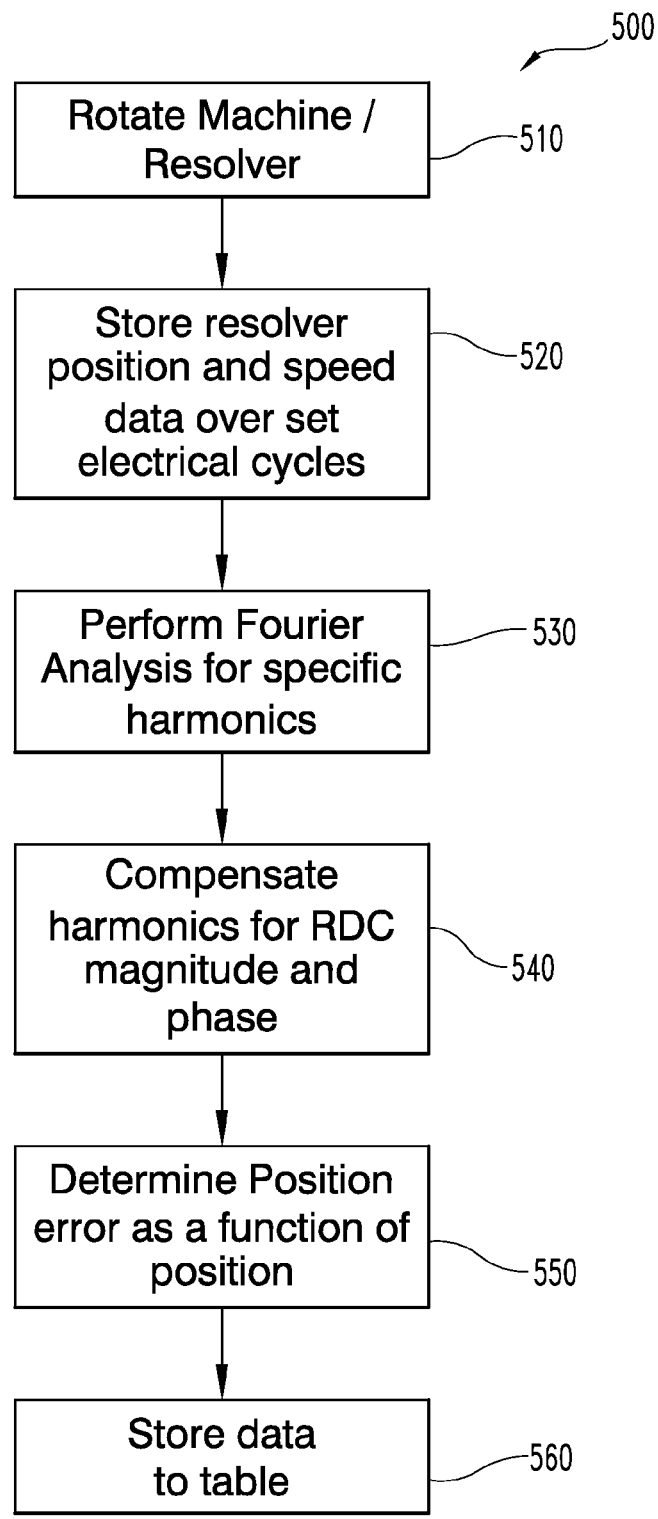
FIG. 5 is a diagram which illustrates the stages involved in correcting position sensor errors in the system of FIG. 1 according to one embodiment.

FIG. 5 illustrates a method 500 for correcting position sensor output signals according to one embodiment. Starting with stage 510, the controller 160 directs the E-machine 120 (via inverter 110) to rotate at different speeds over multiple electrical cycles. In certain embodiments, the E-machine 120 may be spun by an additional external motive device, such as an engine, that is also connected to the resolver 130 rotor. At stage 520, the obtained resolver position and speed data is stored.

Turning to stage 530, a Fourier analysis is performed on the sampled data. Assuming a sufficient number of position and speed samples, an adequate resolution of a Discrete Fourier Transform can be attained that would allow separating the various components of the error signal. Either position or speed (or both) can be used for the analysis, however speed is a more convenient variable as it is a DC signal in the ideal case. In addition, angle-based signals are also more preferable (as opposed to time-based signals) since the error that must be corrected is a function of position, not time. If the resolver is spun at a relatively constant rate, a high speed sampling of the RDC 140 position and speed signals can be performed. A fixed integer number of samples per rotation or, alternatively a sufficiently high number of samples to minimize any windowing effects can then be taken so that approximately fixed angular sampling results. The relationship between speed and position is shown in Equation (9) below.

$$\omega = \Delta\theta/\Delta t \quad (9)$$

where:
ω=angular speed
Δθ=change in angular position
Δt=change in time

Therefore, a fixed time-based sample rate also provides a near constant angular sample rate, provided the speed is relatively fixed. Basic errors, such as linear acceleration, can also be easily corrected if fixed speed cannot be guaranteed. Some speed variation due to other disturbances can be tolerated provided they are sufficiently small compared to the effect of the resolver 130 error. The speed samples taken from the idealized RDC can then be converted into the Fourier frequency domain at stage 530 as follows.

The basic Discrete Fourier Transform (DFT) equations are:

$$A(k) = \frac{1}{N}\sum_{n=0}^{N-1} x(n)e^{-jk\frac{2\pi}{N}n} \quad (10)$$

$$x(n) = \sum_{n=0}^{N-1} A(k)e^{jk\frac{2\pi}{N}n} \quad (11)$$

where:
k=the number of the harmonic order
N=the total number of samples
n=a particular sample within the set of samples
j=the imaginary unit
x(n)=speed waveform in the sampled-angle domain
A(k)=a complex number that indicates magnitude and phase for the $k^{th}$ harmonic order.

A typical position sensor, such as resolver 130, should have an expected harmonic error pattern. For example, a resolver, due to its construction and mounting arrangement would have spectral content at specific harmonics of the resolver frequency. By determining the magnitude and phase of these harmonics, the error at a particular speed can be estimated. Since resolver related speed harmonic amplitude should be proportional to speed for an idealized RDC 140, multiple readings at different speeds can be taken to remove content associated with other sources (such as firing harmonics for an engine) which have amplitudes that are speed dependent. Therefore, harmonics which do not vary proportional to speed can be determined to be unrelated to the resolver 130.

The resulting magnitude and phase at different harmonics represent the combined system effect. Using the inverse of the RDC 140 harmonic gain and phase of FIGS. 2 and 3, the effect of the RDC 140 can removed. The remaining magnitude and phase at the different harmonics represents the error pattern associated with the resolver 130 only and is consistent with equation (8) above. Furthermore, FIG. 4 indicates speed ranges where various harmonics will have the greatest impact on the system, again demonstrating the need to perform measurements at various speeds for maximum sensitivity.

By solving equation (8) for the position error for each harmonic order N, the underlying position error can be extracted. Furthermore, the phase shift information can be adjusted by 90 degrees from the Fourier analysis to account for the integral relationship relating speed to position. This allows the formation of the underlying position error signal shown below.

$$\theta_{error}(\theta) = A_1\sin(\theta+\phi_1) + A_2\sin(2\theta+\phi_2) + A_3\sin(3\theta+\phi_3) + \ldots + A_N\sin(N\theta+\phi_N) \quad (12)$$

where:
θ=angular position
$A_N$=magnitude of the position error $\theta_{error}$ at the Nth harmonic
$\phi_N$=phase of the position error at the Nth harmonic By viewing the resolver error in this fashion, a simple equation containing the position error information due to the resolver 130 can be stored in the error correction controller 150.

Once the underlying resolver error has been found and stored as gain and phase adjustments for different harmonics, the process proceeds to stage 540, where the position error equation is modified to incorporate the additional gain and phase shift associated with the RDC 140 as shown in equation 13 below.

$$\theta_{error}(\theta,RPM) = A_1 RDC_1(RPM)\sin(\theta+\phi_1+\phi_{RDC1}(RPM)) + A_2 RDC_2(RPM)\sin(2\theta+\phi_2+\phi_{RDC2}(RPM)) + A_3 RDC_3(RPM)\sin(3\theta+\phi_3+\phi_{RDC3}(RPM)) + \ldots + A_N RDC_N(RPM)\sin(N\theta+\phi_N+\phi_{RDCN}(RPM)) \quad (13)$$

where:
$RDC_N(RPM)$=the RDC gain associated with the Nth harmonic at a specific speed
$\phi_{RDCN}(RPM)$=the RDC phase associated with the Nth harmonic at a specific speed In the above example, RPM can be calculated from the corrected position or can be taken from the corrected RDC speed information. As can be seen from FIGS. 2 and 3, modest error can be tolerated.

Due to the linear nature of the system, the error $\theta_{error}(\theta, RPM)$ from equation (13) can be subtracted from the original RDC position signal to form the correct position measurement. A speed signal can then be derived from the position signal. An equation for speed error can also be created as shown below in (14).

$$\omega_{error}(\theta, RPM) = A_1 \omega_e RDC_1(RPM)\cos(\theta + \phi_1 + \phi_{RDC1}(RPM)) + A_2 2\omega_e RDC_2(RPM)\cos(2\theta + \phi_2 + \phi_{RDC2}(RPM)) + A_3 3\omega_e RDC_3(RPM)\cos(3\theta + \phi_3 + \phi_{RDC3}(RPM)) + \ldots + A_N N\omega_e RDC_N(RPM)\cos(N\theta + \phi_N + \phi_{RDCN}(RPM))$$ (14)

At stage 550, the information from equations (13) and (14) is determined by the error correction controller 150 at each measured position $\theta$ to determine the proper position error $\theta_{error}$ that should be subtracted to find the uncorrupted position signal as well as the speed error $\omega_{error}$ that should be subtracted from the measured speed.

At stage 560, the error information from stage 550 is stored either as individual equations or stored in a data table, depending on the needs of the particular application. During operation, the error correction controller is able to refer to the stored information to adjust the signal 158 being reported to the motor controller 160 to correct for the expected position error.

It shall be understood that sub-harmonics may also be detected and corrected using the same methodology. Multiple electrical cycles are required to be stored and some form of absolute position tracking (once per rotation—such as provided by an engine crank sensor) is necessary in that case. This tracking can be in the form of a sensor, an algorithm that runs each time the processor is powered on or an algorithm that stores and dynamically checks the validity of the assumed absolute position value each time the processor power is cycled.

In certain embodiments, additional signals may be measured to correct for actual variation in the driven speed of the E-machine 120. If the d-axis and q-axis currents are zero, or regulated to zero, then the phase electro-motive force (EMF) can be either directly or indirectly measured. A Fourier Transform of the EMF signal can then be taken to determine the specific harmonics which are actually occurring in the application (such as engine firing harmonics), and may be used to discern actual speed variation from resolver error. As used herein, the term "actual" shall be interpreted to refer to signal content resulting from operation of the E-machine and which is not induced by the resolver 130 or the RDC 140. For example, if variation in the magnitude of the EMF is observed at the engine firing fundamental frequency, $\omega_N$, the actual speed variation can be determined from the harmonic magnitude and phase of the EMF as follows:

Given the speed variation at the Nth harmonic $$\omega = \omega_0 + N\alpha\,\omega_0 \cos(N\omega_0 t + \phi_N)$$ (15)

where:
t=time
N=the harmonic order number
$\omega_0$=average speed of the motor
$\omega$=engine speed with harmonic variation
$\alpha$=Nth harmonic positional magnitude (radians)
$\phi_N$=Nth harmonic speed phase (radians)
The EMF can be calculated as:

$$EMF = EMF_1(1 + N\alpha\cos(N\omega_0 t + \phi_N))\sin(\omega_0 t + \alpha\sin(N\omega_0 t + \phi_N))$$ (16)

where:
$EMF_1$=the fundamental component of EMF at speed, $\omega_0$
The above expression for EMF can be translated into the frequency domain and shown to have components of EMF at two harmonic orders, N−1, and N+1. That which occurs at the N−1 order will have a magnitude of:

$$EMF_{N-1} = EMF_1\left(\frac{N-1}{2}\right)\alpha$$ (17)

Likewise, the EMF for the N+1 order harmonic will have a magnitude of:

$$EMF_{N+1} = EMF_1\left(\frac{N+1}{2}\right)\alpha$$ (18)

The actual speed magnitude can be found from (17) and (18) to be:

$$\omega_N = \omega_0 N\alpha = \omega_0 N\left(\frac{EMF_{N-1}}{EMF_1}\right)\left(\frac{2}{N-1}\right) = \omega_0 N\left(\frac{EMF_{N-1}}{EMF_1}\right)\left(\frac{2}{N+1}\right)$$ (19)

The phase angle of the speed harmonic can then be found from the respective phase angles of the N−1 and N+1 order harmonics as:

$$\phi_N - \phi_N = \left(\frac{\phi^E_{N-1} + \phi^E_{N-1}}{2}\right) = (\phi^E_{N-1} + \phi^E_1) = (\phi^E_{N+1} - \phi^E_1)$$ (20)

where:
$\phi_N$=the phase angle of the Nth harmonic of speed
$\phi_1^E$=the phase angle of the fundamental EMF
$\phi_{N-1}^E$=the phase angle of the N−1'th harmonic of EMF
$\phi_{N+1}^E$=the phase angle of the N+1'th harmonic of EMF When a resolver harmonic error correlates in harmonic number to a harmonic which is actually occurring in the E-machine, the above methodology can be used to distinguish the actual speed variation of the E-machine from that due to resolver harmonic error.

This can be done by expressing (19) and (20) in a complex form and defining the actual E-machine speed variation as $\omega_{Nactual}$. The harmonic speed error, due to resolver harmonic position error, can be found from measured speed error and $\omega_{Nactual}$ according to equation (21) below.

$$\omega_{Nerror} = \omega_{Nmeasured} - \omega_{Nactual}$$ (21)

where:
$\omega_{Nmeasured}$=the complex measured Nth harmonic speed variation from the resolver
$\omega_{Nerror}$=the complex actual Nth harmonic speed variation due to resolver error The above methodology can be found to work best when EMF data are sampled at discrete time intervals, while operating at a constant speed. However, the above methodology may also be used to correct the measured harmonic speed data when the engine speed shows an acceleration or deceleration over the time that the data is collected. By noting the EMF at the first and last measurement, over an integer number of revolutions, the values can be assumed to be identical (within the bounds of measurement error). To the extent that they are different, a linear fit can be applied to the speed, and the speed data used in the Fourier Transform can be scaled to normalize the data to a constant speed according to equation (22).

$$\omega(t)_{adjusted} = \omega(t)_{measured}\left(1 + \frac{t}{T}\frac{EMF_{final} - EMF_{initial}}{EMF_{initial}}\right) \quad (22)$$

where:
t=time
T=period of the M integer mechanical revolutions
$EMF_{final}$=EMF measured at the final point
$EMF_{initial}$=EMF measured at the initial point The sampling start and end points may also be chosen to occur at times when the voltage level of the EMF is sufficiently large with respect to the measurement noise to improve accuracy. In addition, it shall be understood that fits of data are possible and contemplated by the present disclosure.

The above methodology may also be extended to correct for the angular offset of the resolver 130 to the phase EMF. The offset is typically caused by misalignment of the resolver when mounted to the rotor of the E-machine. If the phase EMF Fourier transform is referenced to the resolver position signal at time zero, then a phase error of the EMF to the position pulse can be calculated and used to correct for resolver angular misalignment.

It shall be understood that the form of the speed ω can be in units of RPM, radians per second, or any other scaled form of the rotational velocity signal received from the resolver 130 and the RDC 140.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A system for controlling a vehicle drivetrain, comprising:
    an electric rotating machine coupled to the vehicle drivetrain;
    an angular position sensor coupled to the electric machine and configured to generate a sensor output signal indicating an angular position of the electric rotating machine;
    a sensor digital converter coupled to the angular position sensor, the sensor digital converter configured to generate a converter output signal using the sensor output signal, wherein the converter output signal includes a first error due to the angular position sensor, and a second error due to the sensor digital converter;
    an error correction controller coupled to the sensor digital converter and configured to analyze the converter output using at least a spectral analysis and a Fourier analysis to generate a corrected position signal compensating for the first and second errors; and
    a motor controller responsive to the corrected position signal received from the error correction controller, the motor controller configured to use the corrected position signal to operate the electric rotating machine at a first angular speed.

2. The system of claim 1, wherein said first error is present at multiple harmonic frequencies of said angular speed.

3. The system of claim 1, wherein the error correction controller performs the spectral analysis on the converter output signal to determine the magnitude and phase of the first error.

4. The system of claim 1, wherein the error correction converter performs the Fourier analysis to determine position and speed components of the first error.

5. The system of claim 1, wherein the first error due to the angular position sensor comprises a sensor position error which is independent of speed.

6. The system of claim 1, wherein the second error due to the sensor digital converter is dependent on speed and does not vary proportionally with speed.

7. The system of claim 1, wherein the controller measures the phase EMF of the electric rotating machine; and wherein the controller performs a spectral analysis of the EMF signal to determine the specific harmonics which are due to an actual speed variation in the electric rotating machine.

8. The system of claim 7, wherein the spectral analysis comprises Fourier analysis.

9. The system of claim 1, wherein the error correction controller distinguishes an actual speed variation of the electric rotating machine from the first error.

10. The system of claim 1, wherein the electric rotating machine is a rotating electrical motor generator.

11. The system of claim 1, wherein the vehicle is a hybrid electric vehicle.

12. The system of claim 1, wherein the angular position sensor is a resolver.

13. The system of claim 1, wherein the controller normalizes speed data determined from the converter output signal when the angular speed of the electric rotating machine is changing over time.

14. The system of claim 1, wherein the controller further compensates for an angular offset of the angular position sensor.

15. A method for controlling a vehicle drivetrain, comprising:
    using a motor controller to rotate an electric rotating machine coupled to the motor controller, the electric rotating machine coupled to an angular position sensor, the angular position sensor generating a sensor output signal indicating an angular position of the electric rotating machine when the motor controller rotates the electric rotating machine;
    generating a converter output signal from the sensor output signal using a sensor digital converter coupled to the angular position sensor and responsive to the sensor output, wherein the converter output signal includes a first error due to the angular position sensor, and a second error due to the sensor digital converter;
    storing converter output signal data representing the converter output signal received from the sensor digital converter over at least one electrical cycle in a memory in an error correction controller, the error correction controller coupled to the sensor digital converter;
    automatically performing a spectral analysis and a Fourier analysis on the converter output signal data to generate a corrected position signal using the error correction controller, the corrected position signal calculated by the error correction controller to compensate for the effects of both the first error and the second error; and
    adjusting the measured angular speed and position of the electric rotating machine using the motor controller, wherein the motor controller is coupled to the error correction controller and is responsive to the corrected position signal.

16. The method of claim 15, wherein the spectral analysis on the converter output signal data is being performed to determine a magnitude and phase of the error due to the angular position sensor.

17. The method of claim 15, wherein the error correction controller performs the Fourier analysis to determine position and speed components of the first error.

18. The method of claim 15, wherein the first error due to the angular position sensor is independent of speed.

19. The method of claim 15, wherein the second error due to the sensor digital converter is dependent on speed and does not vary proportionally with speed.

20. The method of claim 15, wherein the error correction controller measures the phase EMF of the electric rotating machine; and wherein the error correction controller performs a spectral analysis of the EMF signal to determine the specific harmonics which are due to an actual speed variation of the electric rotating machine.

21. The method of claim 20, wherein the spectral analysis comprises Fourier analysis.

22. The method of claim 15, wherein the controller distinguishes an actual speed variation of the electric rotating machine from a resolver error.

23. The method of claim 15, wherein the electric rotating machine is a rotating electrical motor generator.

24. The method of claim 15, wherein the vehicle is a hybrid electric vehicle.

25. The method of claim 15, wherein the angular position sensor is a resolver.

26. The method of claim 15, wherein the controller normalizes speed data determined from the output of the sensor digital converter when the angular speed of the electric rotating machine is changing over time.

27. The method of claim 15, wherein the controller compensates for an angular offset of the resolver.

\* \* \* \* \*